(12) United States Patent
Gilbert et al.

(10) Patent No.: US 12,546,225 B2
(45) Date of Patent: Feb. 10, 2026

(54) WOVEN REINFORCING FIBER AIRFOIL STRUCTURE FOR A TURBINE ENGINE

(71) Applicant: General Electric Company, Schenectady, NY (US)

(72) Inventors: Aaron M. Gilbert, West Newbury, MA (US); Ming Xie, Dayton, OH (US); Mitchell Boyer, Cincinnati, OH (US); Heidi J. Stegemiller, Franklin, OH (US); Daniel T. Weisbrod, Sunman, IN (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/632,959

(22) Filed: Apr. 11, 2024

(65) Prior Publication Data

US 2025/0320823 A1   Oct. 16, 2025

(51) Int. Cl.
*F01D 5/28* (2006.01)
*F01D 5/14* (2006.01)

(52) U.S. Cl.
CPC .............. *F01D 5/282* (2013.01); *F01D 5/147* (2013.01); *F05D 2300/6012* (2013.01)

(58) Field of Classification Search
CPC .................................. F01D 5/282; F01D 5/147
See application file for complete search history.

(56) References Cited

U.S. PATENT DOCUMENTS

| | | | |
|---|---|---|---|
| 7,247,002 B2 | 7/2007 | Albrecht et al. | |
| 8,127,802 B2 | 3/2012 | Ouellette et al. | |
| 8,499,450 B2 | 8/2013 | Naik | |
| 8,696,319 B2 | 4/2014 | Naik | |
| 9,488,056 B2 | 11/2016 | Nagle et al. | |
| 9,664,052 B2 | 5/2017 | Delvaux et al. | |
| 9,752,441 B2* | 9/2017 | Hildebrand | F01D 11/122 |
| 10,519,576 B2 | 12/2019 | Marchal et al. | |
| 10,556,367 B2 | 2/2020 | Marin et al. | |
| 10,724,159 B2 | 7/2020 | Marchal et al. | |
| 11,040,465 B2 | 6/2021 | Guivarc'h et al. | |
| 11,168,567 B2* | 11/2021 | Gondre | F04D 29/023 |
| 11,753,949 B2* | 9/2023 | Gondre | F04D 29/324 |
| | | | 416/230 |
| 2013/0017093 A1 | 1/2013 | Coupe et al. | |
| 2020/0141268 A1 | 5/2020 | Kray et al. | |
| 2021/0008840 A1 | 1/2021 | Gurijala et al. | |
| 2021/0396142 A1 | 12/2021 | De Gaillard et al. | |
| 2022/0403748 A1* | 12/2022 | Marchal | F01D 5/147 |
| 2023/0119475 A1 | 4/2023 | Notarianni et al. | |
| 2024/0093611 A1 | 3/2024 | Rakotoarisoa et al. | |

* cited by examiner

*Primary Examiner* — Michael L Sehn
(74) *Attorney, Agent, or Firm* — Venable LLP; Michele V. Frank

(57) ABSTRACT

An airfoil includes a non-uniform weave structure that is two-dimensional or three-dimensional, the non-uniform weave structure including a plurality of reinforcing fibers, the non-uniform weave structure having a first region with a first stiffness and a second region with a second stiffness higher than the first stiffness, wherein the plurality of reinforcing fibers include higher density fibers in the second region and lower density fibers in the first region so as to increase a stiffness of the airfoil at the second region of the airfoil in a desired orientation to achieve a desired aeromechanics response of the airfoil.

18 Claims, 4 Drawing Sheets

WOVEN REINFORCING FIBER AIRFOIL STRUCTURE FOR A TURBINE ENGINE

GOVERNMENT INTEREST

This invention was made with United States Government support. The United States Government may have certain rights in the invention.

TECHNICAL FIELD

The present disclosure relates generally to airfoils in turbine engines and, in particular, to a two-dimensional or a three-dimensional woven reinforcing fiber airfoil structure.

BACKGROUND

Turbine engines, such as gas turbine engines, generally include a fan and an engine core. The fan includes fan blades or rotating airfoils. The engine core includes stator airfoils.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
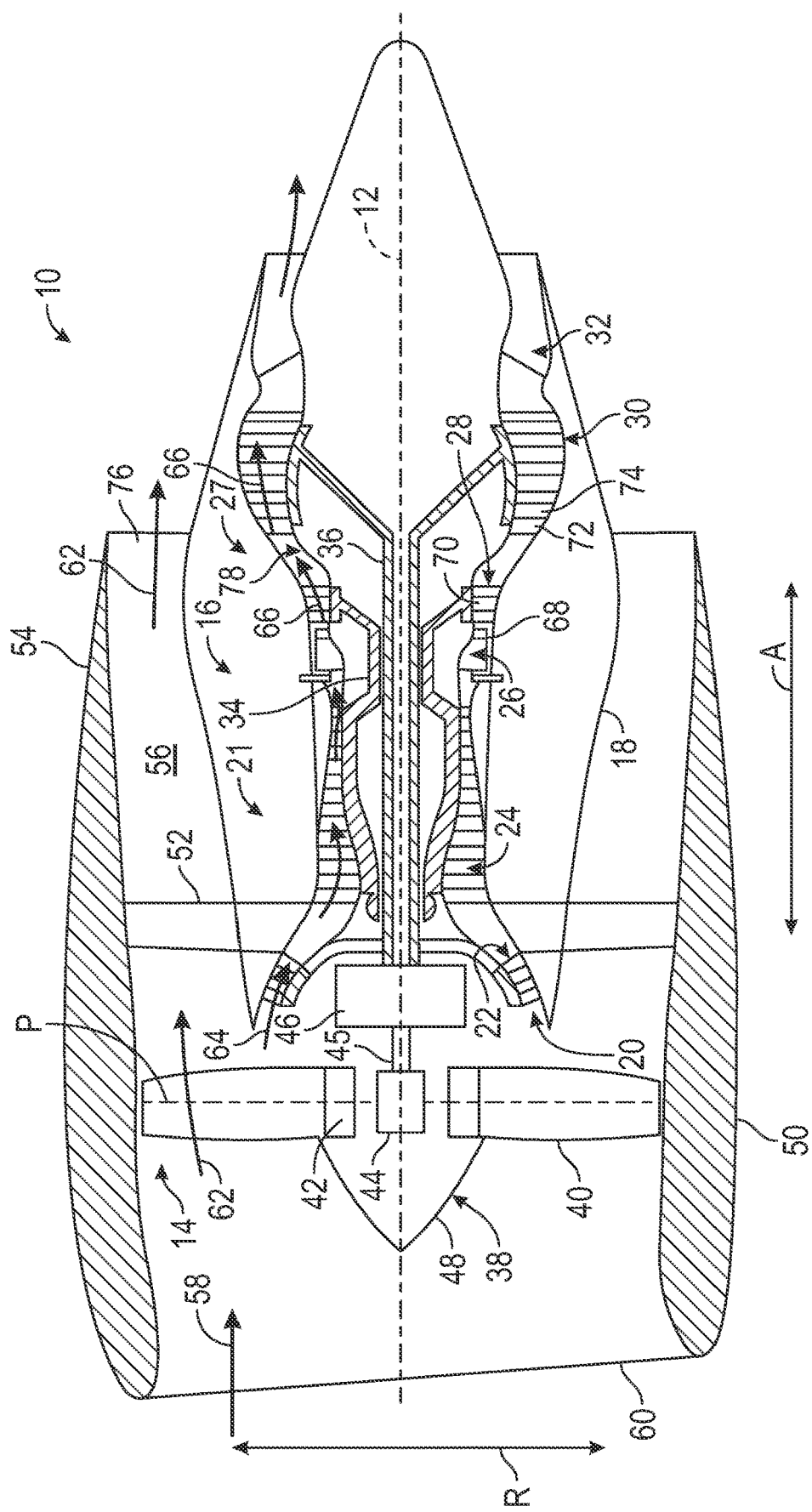
FIG. 1 is a schematic cross-sectional diagram of a turbine engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a," "an," and "the" include plural references unless the context clearly dictates otherwise.

As used herein, the term "axial" refers to directions and orientations that extend substantially parallel to a centerline of the turbine engine. Moreover, the term "radial" refers to directions and orientations that extend substantially perpendicular to the centerline of the turbine engine. In addition, as used herein, the term "circumferentially" refers to directions and orientations that extend arcuately about the centerline of the turbine engine.

As used herein, the terms "first," "second," "third," and the like, may be used interchangeably to distinguish one component from another and are not intended to signify location or importance of the individual components.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a component material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials. The composite may be formed of a matrix material and a reinforcing element, such as a fiber (referred to herein as a reinforcing fiber).

As used herein "reinforcing fibers" may include, for example, glass fibers, carbon fibers, steel fibers, or para-aramid fibers, such as Kevlar® available from DuPont of Wilmington, Delaware. The reinforcing fibers may be in the form of fiber tows that include a plurality of fibers that are formed into a bundle. The polymeric matrix material may include, for example, thermoset resin, bismaleimide (BMI) materials, polyimide materials, or thermoplastic resin.

"Preform" as used herein is a piece of three-dimensional composite woven fabric formed by a plurality of reinforcing fibers including warp fiber tows and weft fiber tows.

As may be used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As may be used herein, PMC refers to a class of materials. The PMC material may be a prepreg. A prepreg is a reinforcement material (e.g., a reinforcing fiber) pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of a non-limiting example, electrostatically, and then adhered to the fiber, by way of a non-limiting example, in an oven or with the assistance of heated rollers.

Resins for matrix materials of PMCs can be generally classified as thermoset resin polymers or thermoplastic resin polymers. Thermoplastic resin polymers are generally categorized as polymers that can be repeatedly softened and flowed when heated, and hardened when sufficiently cooled due to physical rather than chemical changes. Notable example classes of thermoplastic resin polymers include nylons, thermoplastic polyesters, polyaryletherketones, and polycarbonate resins. A specific example of high-performance thermoplastic resins that have been contemplated for use in aerospace applications include polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead, thermally decompose when sufficiently heated. Notable examples of thermoset resin polymers include epoxy, bismaleimide (BMI), and polyimide resins.

Instead of using a prepreg with thermoplastic polymers, another non-limiting example utilizes a woven fabric. A woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or a cavity. The dry fibers can include prepreg, braided material, woven material, or any combination thereof. Resin can be pumped into or otherwise provided to the mold or the cavity to impregnate the dry fibers. The combination of the impregnated fibers and the resin are then cured and removed from the mold. When removed from the mold, the composite component can require post-curing processing. RTM may be a vacuum assisted process. That is, the air from the cavity or the mold can be removed and replaced by the resin prior to heating or curing. The placement of the dry fibers can be manual or automated. The dry fibers can be contoured to shape the composite component or to direct the resin. Optionally, additional layers or reinforcing layers of a material differing from the dry fiber can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled (e.g., form fiber tows) and/or coated prior to inclusion within the matrix. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with the silicon carbide. A CMC material as used herein may be formed using any known or hereafter developed methods including, but not limited to, melt infiltration, chemical vapor infiltration, polymer impregnation pyrolysis (PIP), or any combination thereof.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

Traditional layup designs typically used for forming composite gas turbine engine components are challenging to manufacture and may have limited interlaminar strength.

Specifically, composite components for gas turbine engines are generally constructed with hand laid plies or by combining multiple woven or prefabricated preforms into one molded part. Hand layup or assembly of preforms increases the labor and costs required to build the component. Assembly of preforms also comes with assembly and positioning challenges. Moreover, a composite component formed from conventional 2D plies or multiple preforms will be more likely to have limited interlaminar loading capability.

A turbine engine, such as a gas turbine engine, generally includes a fan and a core arranged in flow communication with one another with the core disposed downstream of the fan in the direction of flow through the turbine engine. The core of the turbine engine generally includes, in serial flow order, a compressor section, a combustion section, a turbine section, and an exhaust section. With multi-shaft gas turbine engines, the compressor section can include a high-pressure compressor (HPC) disposed downstream of a low-pressure compressor (LPC), and the turbine section can similarly include a low-pressure turbine (LPT) disposed downstream of a high-pressure turbine (HPT). With such a configuration, the HPC is coupled with the HPT via a high-pressure shaft (HPS), and the LPC is coupled with the LPT via a low-pressure shaft (LPS). Various sections of the turbine engine including the fan, the HPC, the LPC, the HPT, and the LPT include rotors and a plurality of blades coupled to the rotors.

Flutter can occur at subsonic speeds and at supersonic speeds based on flow conditions at the fan inlet. Subsonic flutter typically occurs at about fifty percent to about eighty percent of the operating corrected speed of the rotor. Supersonic flutter typically occurs at about one hundred percent to one hundred five percent (e.g., overspeed) of the operating corrected speed of the rotor. The corrected speed of the rotor is the altitude equivalent speed at sea level in ambient conditions. When the turbine engine operates in the subsonic flutter corrected speed range and/or in the supersonic flutter corrected speed range, a shock, also referred to as a loading shock, is generated on the suction side of the blades and relatively close to the leading edge (LE) of the blades. For example, the shock may be generated at about twenty percent to thirty percent from the LE of the blades. The shock may cause the blades to vibrate due to the random forces available in the system at harmless amplitudes. As the blades vibrate, the shock generates perturbed unsteady pressure and generates the aerodynamic work, as detailed above. Positive energy may be added to the blade and results in vibration of the blade with a greater amplitude, which may cause a self-excited vibration. The shock (e.g., the unsteady pressure) may propagate circumferentially around the rotor and may propagate upstream and/or downstream of the blades. The various embodiments described herein, and shown in the figures, are directed to mitigating flutter risks in engines.

Aeromechanic stability may be needed in any airfoil and, in particular, for stator airfoils. Generally, geometry changes (e.g., chord length, camber, span thickness, etc.) can be used to control natural frequencies and aeromechanics responses. Non-uniform (two-dimensional or three-dimensional) woven carbon fiber composite airfoils allow additional alteration of the material properties by prescribing a percentage of fiber relative to a matrix in a desired location or orientation. The matrix can be, for example, a polymer (PMC) or a ceramic (CMC), as described in the paragraphs above.

Some embodiments of the present disclosure provide, for example, a non-uniform 3D carbon fiber weave structure or a non-uniform 2D carbon fiber weave structure to increase airfoil stiffness in a specific orientation. The stiffness can be controlled by a percentage of fiber content relative to the matrix (e.g., PMC or CMC). The stiffness can also be controlled by a ratio of spanwise to chordwise to through thickness fiber at a constant bulk fiber to matrix ratio. The stiffness can provide increased directional modulus for desired aeromechanics responses. The non-uniform 3D carbon fiber weave structure resembles a sandwich structure that varies through the thickness of an airfoil. However, the non-uniform 3D carbon fiber weave structure can also alter material properties by varying along the chord and spanwise directions of the airfoil. The non-uniform 2D weave structure can be formed from a plurality of integrated 2D plies of interlacing fibers (for example, one or more 2D plies can be interlaced with another 2D ply). The stiffness can be controlled by a percentage of fiber content relative to the matrix (e.g., PMC or CMC). The stiffness can also be controlled by varying density of fibers, varying modulus of the fibers, or varying sizes of the fibers.

In an embodiment, lighter density fibers can be provided in a center core region, for example. In an embodiment, multiple fiber sizes can be used. For example, two or more weft fibers can be used.

In an embodiment, varying modulus and/or density of the fiber can also be used. This can result in constant bulk fiber volume with altered stiffness properties. Integrated outer layers and core with through thickness fiber can also be used. In addition, regions of variable structure and/or density can also be made to transition back to a constant structure outside of desired tuning region.

Referring now to the drawings, FIG. 1 is a schematic cross-sectional diagram of a turbine engine 10, according to an embodiment of the present disclosure. As shown in FIG. 1, the turbine engine 10 defines an axial direction A (extending parallel to a longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft or a spool 34 drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox 46. The power gearbox 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbo-engine 16. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of the air 62 is directed or routed into the bypass airflow passage 56, and a second portion of the air 64 is directed or is routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or the spool 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate. This thereby supports operation of the LP compressor 22 and rotation of the fan 38 via the power gearbox 46.

The combustion gases 66 are subsequently routed through the jet exhaust nozzle section 32 of the turbo-engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
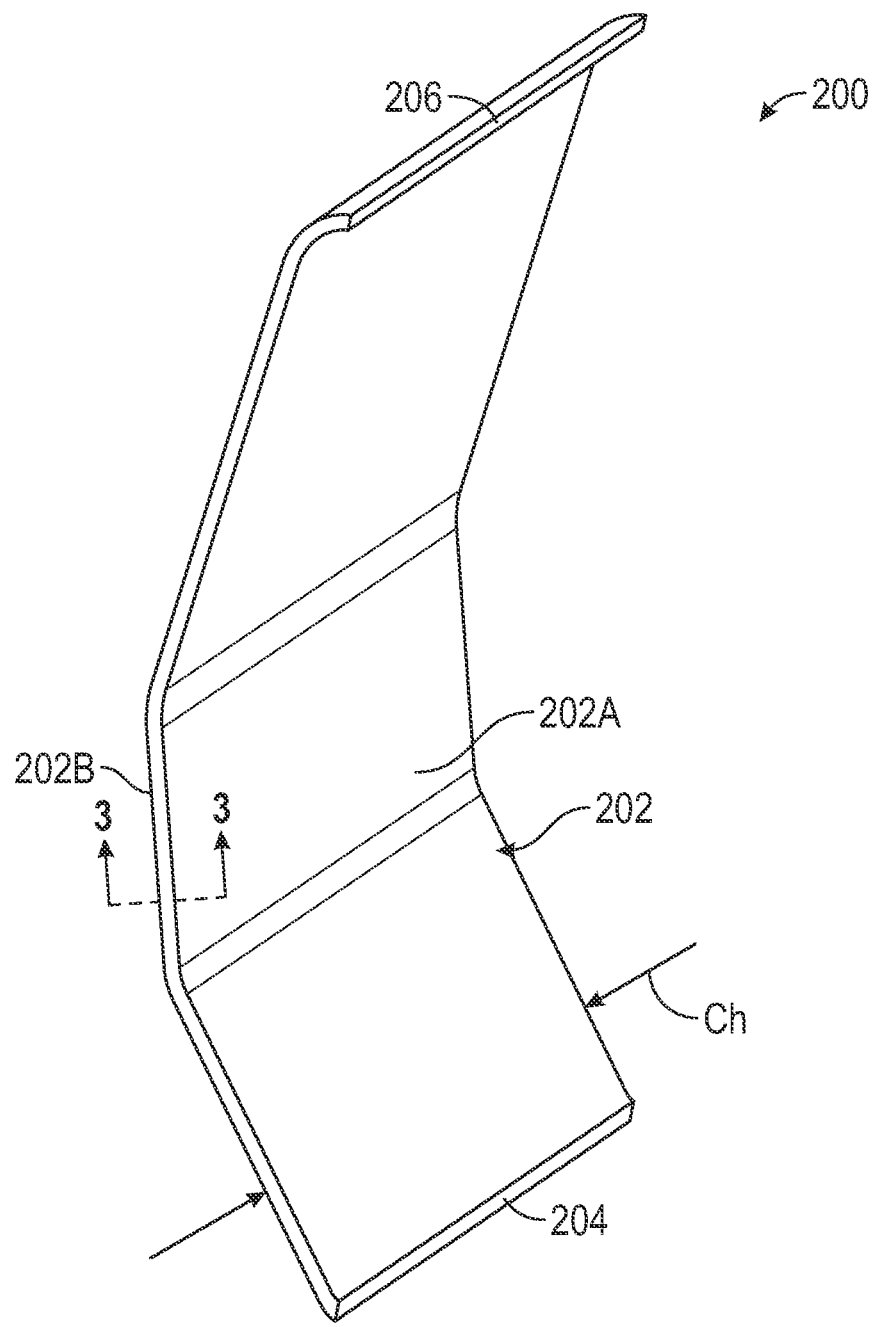
FIG. 2 is an elevation view of a stator airfoil, according to an embodiment of the present disclosure.

FIG. 2 is a perspective view of a stator airfoil 200, according to an embodiment of the present disclosure. The stator airfoil 200 is provided with an aero-mechanically reinforced region 202 to provide more strength such as tensile strength and stiffness within the region 202. For example, the stiffness can provide increased directional modulus. The region 202 includes a three-dimensional (3D) woven carbon fiber composite structure comprising a non-uniform 3D carbon fiber weave structure or a non-uniform 2D carbon fiber weave structure (e.g., formed of a plurality of integrated 2D plies of interlacing fibers) to increase mechanical stiffness of the stator airfoil at the region 202. The region 202 is located between an inner diameter 204 and an outer diameter 206 of the stator airfoil 200. The region 202 has a first airfoil surface 202A and a second airfoil surface 202B.

Figure 3:
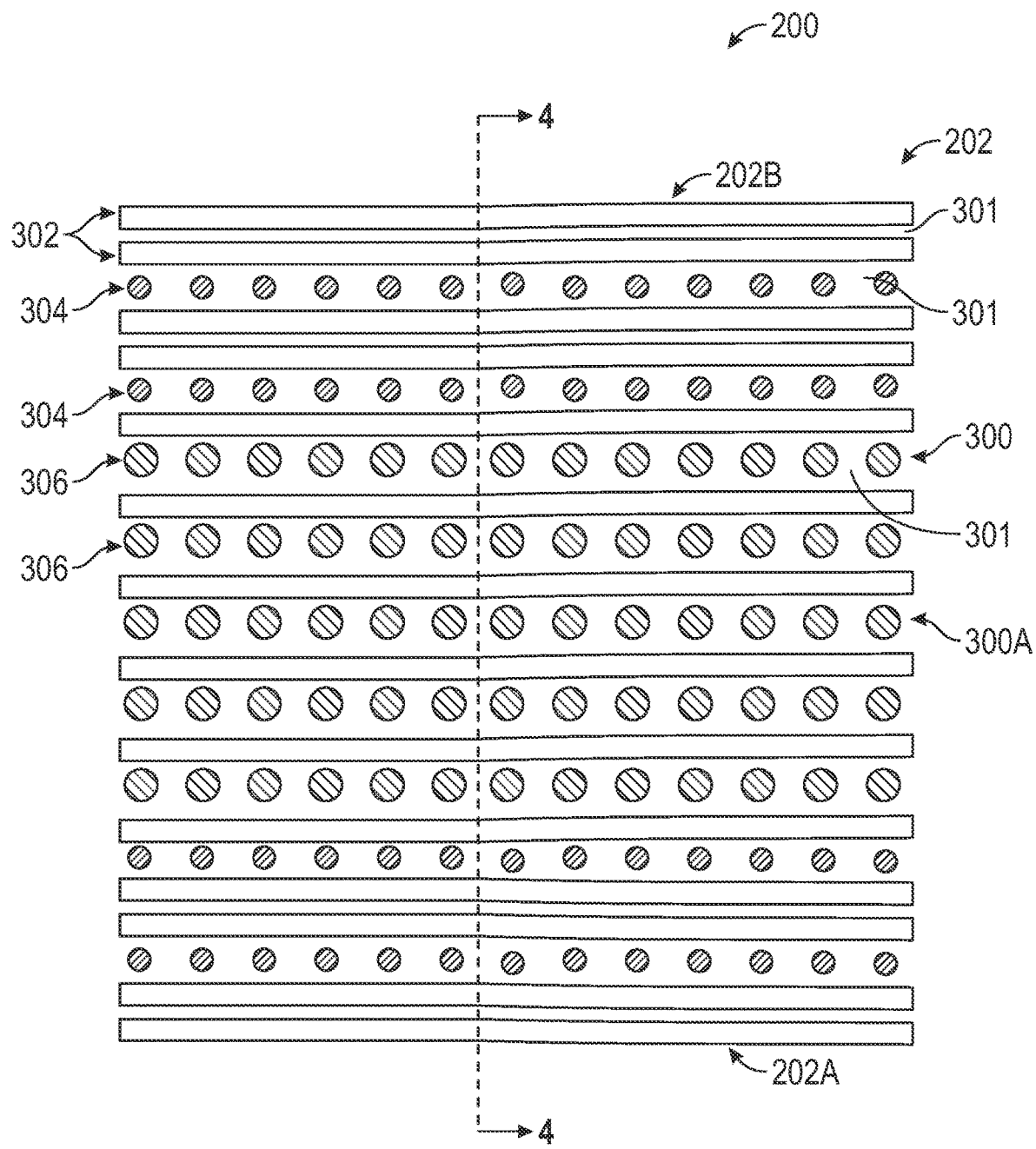
FIG. 3 is a schematic representation of a cross section of a three-dimensional woven carbon fiber composite structure taken along a cross-sectional line 3-3 shown in FIG. 2, according to an embodiment of the present disclosure.

FIG. 3 is a schematic representation of a cross section of the three-dimensional woven carbon fiber composite structure taken along a cross-sectional line 3-3 shown in FIG. 2 in the region 202 of the stator airfoil 200, according to an embodiment of the present disclosure. FIG. 3 shows the first airfoil surface 202A and the second airfoil surface 202B of the region 202 of the stator airfoil 200. As shown in FIG. 3, the region 202 of the stator airfoil 200 comprises a plurality of carbon fibers 300 arranged in a three-dimensional weave structure (e.g., interlocking Z-weave structure). The three-dimensional weave structure is selected to increase stiffness of the stator airfoil 200 at a selected region 202 of the stator airfoil 200 in a desired orientation to achieve a desired aeromechanics response of the stator airfoil 200. The stiffness of the stator airfoil 200 is controlled by selecting a percentage, by weight or by volume, of a content of the plurality of carbon fibers 300 relative to a content of a matrix (not shown for clarity). The matrix can be a resin (not shown) that is used as a cross-linking agent to penetrate and to fill in voids 301 between the plurality of carbon fibers 300 to link the plurality of the carbon fibers 300 together once the resin is cured. The resin can be a polymer, for example, as described in the paragraphs above. The resin can be cured using heat or light such as ultraviolet light. In an embodiment, as shown in FIG. 3, the three-dimensional weave structure in the region 202 of the stator airfoil 200 has a sandwich structure that varies along a thickness direction of the airfoil. The thickness direction is defined between the first airfoil surface 202A and the second airfoil surface 202B. In another embodiment, the three-dimensional weave structure in the region 202 of the stator airfoil 200 has a sandwich structure that varies along a chord direction "Ch" of the stator airfoil 200 (shown in FIG. 2). In an embodiment, the plurality of the carbon fibers 300 comprises lighter fibers (less dense) provided in a core region 300A of a thickness of the stator airfoil 200 and denser fibers provided towards the first airfoil surface 202A or the second airfoil surface 202B, or both, of the stator airfoil 200. In an embodiment, the plurality of carbon fibers 300 have varying modulus or varying sizes, or both, to provide a desired stiffness in desired regions of the stator airfoil 200.

As shown in FIG. 3, the region 202 of the stator airfoil 200 comprises a first plurality of carbon fibers 302, a second plurality of carbon fibers 304, and a third plurality of carbon fibers 306. In this embodiment, the first plurality of carbon fibers 302 correspond to weft fibers, the second plurality of carbon fibers 304 and the third plurality of carbon fibers 306 correspond to warp fibers. In an embodiment, as shown in FIG. 3, the second plurality of carbon fibers 304 and the third plurality of carbon fibers 306 have different diameters. As shown in FIG. 3, the first plurality of carbon fibers 302 (the weft fibers) run parallel to the plane of the figure, whereas the second plurality of carbon fibers 304 and the third plurality of carbon fibers 306 (the warp fibers) run substantially perpendicular to the plane of the figure. Therefore, the second plurality of carbon fibers 304 (the warp fibers) and the third plurality of carbon fibers 306 (the warp fibers) are substantially perpendicular to the first plurality of carbon fibers 302 (the weft fibers). The term "substantially perpendicular" is used herein to mean an angle equal to 90 degrees±10 degrees. The second plurality of carbon fibers 304 and the third plurality of carbon fibers 306 are substantially parallel to each other and the second plurality of carbon fibers 304 have a diameter less than a diameter of the third plurality of carbon fibers 306.

As shown in FIG. 3, at least one of the first plurality of carbon fibers 302 is located in the vicinity of the first airfoil surface 202A or the second airfoil surface 202B, or both. As shown in FIG. 3, two or more of the first plurality of carbon fibers 302 are provided contiguous to each other and are located near the first airfoil surface 202A or the second airfoil surface 202B, or both. By providing two or more of the first plurality of carbon fibers 302 contiguous to each other and near the first airfoil surface 202A or the second airfoil surface 202B, or both, the stiffness of the stator airfoil 200 can be increased near the first airfoil surface 202A, the second airfoil surface 202B, or both.

Furthermore, by providing the second plurality of carbon fibers 304 having a lesser diameter, more fibers can be provided adjacent to each other to increases compactness and, thus, ultimately, the stiffness near the first airfoil surface 202A or near the second airfoil surface 202B, or both. On the other hand, the third plurality of carbon fibers 306 having a greater diameter can be used away from the first airfoil surface 202A and the second airfoil surface 202B towards the middle or core region 300A of the thickness of the region 202 of the stator airfoil 200. In this way, mechanical design requirement can be achieved without wasting material in the middle or core region 300A of the thickness of the region 202 of the stator airfoil 200.

Furthermore, as shown in FIG. 3, the third plurality of carbon fibers 306 are shown having a diameter greater than a diameter of the first plurality of carbon fibers 302 or a diameter of the second plurality of carbon fibers 304 and are used within the middle or the core region 300A of the region 202 of the stator airfoil 200. However, the region 202 is not limited to the configuration shown. For example, the third plurality of carbon fibers 306 can be selected as having a diameter less than or equal to a diameter of the first plurality of carbon fibers 302 or as having a diameter less than or equal to a diameter of the second plurality of carbon fibers 304.

In an embodiment, the ultimate goal is to provide a stiffer structure near the first airfoil surface 202A and/or the second airfoil surface 202B. This can be achieved, for example, by providing two or more fibers of the first plurality of carbon fibers 302 near the first airfoil surface 202A and/or the second airfoil surface 202B, or by providing densely compact first plurality of carbon fibers 302 or densely compact second plurality of carbon fibers 304. The characteristic "densely compact" can be achieved by reducing a distance between two adjacent fibers in the first plurality of carbon fibers 302 or by reducing a distance between the second plurality of carbon fibers 304, or both. The characteristic "densely compact" can also be achieved by using a smaller-diameter fibers for the first plurality of carbon fibers 302 or by using a smaller-diameter fibers for the second plurality of carbon fibers 304, or both, so as to be able to fit more fibers within a smaller volume.

Figure 4:
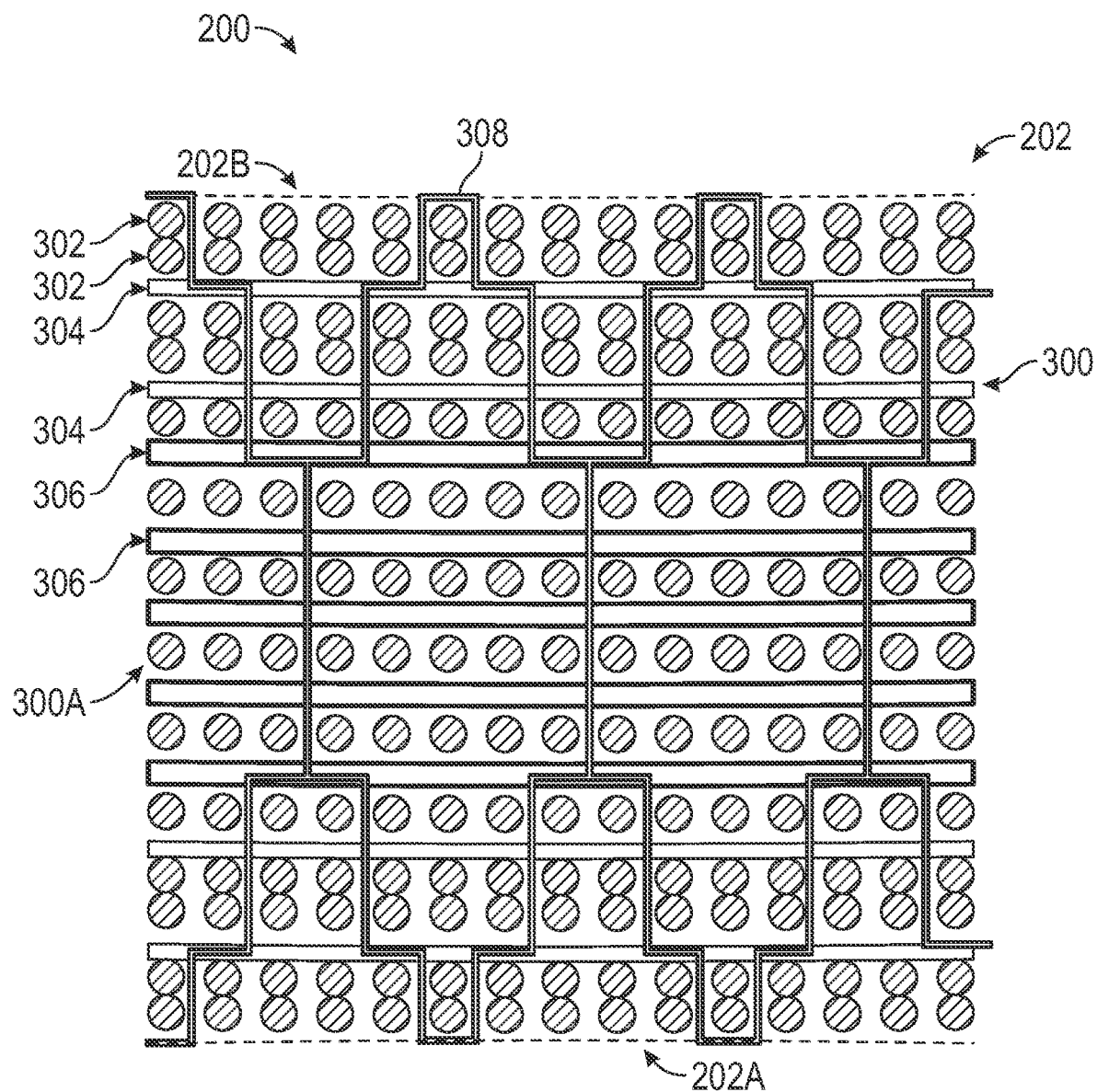
FIG. 4 is a schematic representation of a cross section of the three-dimensional woven carbon fiber composite structure taken along a cross-sectional line 4-4 shown in FIG. 3, according to an embodiment of the present disclosure.

FIG. 4 is a schematic representation of a cross section of the three-dimensional woven carbon fiber composite structure taken along a cross-sectional line 4-4 shown in FIG. 3 in the region 202 of the stator airfoil 200, according to an embodiment of the present disclosure. In FIG. 3, the first plurality of carbon fibers 302 are shown parallel to the plane of the figure, whereas as shown in FIG. 4, the first plurality of carbon fibers 302 are shown perpendicular to the plane of the figure. Similarly, while in FIG. 3, the second plurality of carbon fibers 304 and the third plurality of carbon fibers 306 are shown being perpendicular to the plane of the figure, in FIG. 4, the second plurality of carbon fibers 304 and the third plurality of carbon fibers 306 are shown being parallel to the plane of the figure. In addition to the first plurality of carbon fibers 302, the second plurality of carbon fibers 304, and the third plurality of carbon fibers 306, a fourth plurality of carbon fibers 308 is also provided. The fourth plurality of carbon fibers 308 are used to link or to tie together the first plurality of carbon fibers 302, the second plurality of carbon fibers 304 and the third plurality of carbon fibers 306. Although, in FIGS. 3 and 4, the region 202 is shown being symmetrical in that the same types and number of fibers are provided near the first airfoil surface 202A and near the second airfoil surface 202B, the region 202 may also be non-symmetrical. For example, in a non-symmetrical configuration, a pair of the first plurality of carbon fibers 302 can be provided near the first airfoil surface 202A but only one fiber or no fibers of the first plurality of carbon fibers 302 may be provided near the second airfoil surface 202B.

The use of a plurality of carbon fibers 300, contrary to using metallic material fibers, provides the flexibility of designing the structure as desired to achieve certain aeromechanical properties, such as stiffness, at desired locations of the stator airfoil 200. A non-uniform 3D carbon fiber weave structure or a non-uniform 2D carbon fiber weave structure is described as being used in a stator airfoil. However, the non-uniform 3D carbon fiber weave structure or the non-uniform 2D carbon fiber weave structure can be also used in a fan airfoil (i.e., a rotating airfoil).

Although carbon fibers are described in the paragraph above being used in the three-dimensional (3D) woven carbon fiber composite structure, other types of reinforcing fibers can also be used, including, but not limited to, glass fibers, basalt fibers, KEVLAR® (poly-para-phenylene terephthalamide) fibers, available from DuPont corporation located in Wilmington, DE, etc. Furthermore, although a three-dimensional (3D) woven carbon fiber composite structure (e.g., Z-weave interlocking fiber structure) is described in the paragraphs above as being used in the airfoil, a two-dimensional (2D) woven reinforcing fiber composite structure can also be used. The two-dimensional (2D) woven reinforcing fiber composite structure may include a plurality of integrated 2D plies of interlacing fibers (for example, one or more 2D plies can be interlaced with another 2D ply).

For example, a non-uniform (e.g., three-dimensional or Z-weave interlocking) woven carbon fiber composite airfoil allows additional alteration of the material properties by prescribing a ratio of spanwise to chordwise to through thickness fiber at a constant bulk fiber to resin ratio.

Embodiments of the present disclosure provide a non-uniform 3D carbon fiber weave structure or a non-uniform 2D carbon fiber weave structure to increase airfoil stiffness in a specific orientation. The stiffness can be controlled by a percentage of fiber content relative to resin. The stiffness can provide increased directional modulus for desired aeromechanics responses. The non-uniform 3D carbon fiber weave structure resembles a sandwich structure that varies through the thickness of an airfoil. However, the non-uniform 3D carbon fiber weave structure can also vary chordwise to alter material properties of the airfoil in the chordwise direction. The non-uniform 2D weave structure can be formed from a plurality of integrated 2D plies of interlacing fibers (for example, one or more 2D plies can be interlaced with another 2D ply). The stiffness can be controlled by a percentage of fiber content relative to the matrix (e.g., PMC or CMC). The stiffness can also be controlled by varying density of fibers, varying modulus of the fibers, or varying sizes of the fibers.

Further aspects are provided by the subject matter of the following clauses.

An airfoil includes a non-uniform weave structure that is two-dimensional or three-dimensional, the non-uniform weave structure including a plurality of reinforcing fibers, the non-uniform weave structure having a first region with a first stiffness and a second region with a second stiffness higher than the first stiffness, wherein the plurality of reinforcing fibers include higher density fibers in the second region and lower density fibers in the first region so as to increase a stiffness of the airfoil at the second region of the airfoil in a desired orientation to achieve a desired aeromechanics response of the airfoil.

The airfoil of the preceding clause, wherein the stiffness of the airfoil is controlled by selecting a percentage of a content of the plurality of reinforcing fibers relative to an amount of a resin.

The airfoil of any preceding clause, wherein the non-uniform weave structure has a sandwich structure that varies along a thickness direction of the airfoil.

The airfoil of any preceding clause, wherein the non-uniform weave structure has a sandwich structure that varies along a chord direction of the airfoil.

The airfoil of any preceding clause, wherein the plurality of the reinforcing fibers comprises lighter fibers provided in a center core region of a thickness of the airfoil and denser fibers provided towards a first airfoil surface or a second airfoil surface, or both, of the airfoil.

The airfoil of any preceding clause, wherein the plurality of reinforcing fibers have a varying modulus or varying sizes, or both, to provide a desired stiffness in desired regions of the airfoil.

The airfoil of any preceding clause, wherein the airfoil is a stator airfoil of a turbine engine.

The airfoil of any preceding clause, wherein the plurality of reinforcing fibers comprises a first plurality of reinforcing fibers, a second plurality of reinforcing fibers, and a third plurality of reinforcing fibers, wherein the second plurality of reinforcing fibers and the third plurality of reinforcing fibers are substantially perpendicular to the first plurality of reinforcing fibers.

The airfoil of any preceding clause, wherein the second plurality of reinforcing fibers and the third plurality of reinforcing fibers are substantially parallel to each other and the second plurality of reinforcing fibers have a diameter less than a diameter of the third plurality of reinforcing fibers.

The airfoil of any preceding clause, wherein two or more of the first plurality of reinforcing fibers are provided contiguous to each other near a first airfoil surface of the airfoil or a second airfoil surface of the airfoil, or both, so as to increase a stiffness of the airfoil at the first airfoil surface or at the second airfoil surface, or both.

The airfoil of any preceding clause, wherein the third plurality of reinforcing fibers have a diameter greater than the first plurality of reinforcing fibers and the second plurality of reinforcing fibers, and the third plurality of reinforcing fibers are provided within a central core region of a thickness of the airfoil.

The airfoil of any preceding clause, wherein the plurality of reinforcing fibers further comprises a fourth plurality of reinforcing fibers, the fourth plurality of reinforcing fibers linking the first plurality of reinforcing fibers, the second plurality of reinforcing fibers, and the third plurality of reinforcing fibers.

A turbine engine includes an airfoil. The airfoil includes a non-uniform weave structure that is two-dimensional or three-dimensional, the non-uniform weave structure including a plurality of reinforcing fibers, the non-uniform weave structure having a first region with a first stiffness and a second region with a second stiffness higher than the first stiffness, wherein the plurality of reinforcing fibers include higher density fibers in the second region and lower density fibers in the first region so as to increase a stiffness of the airfoil at the second region of the airfoil in a desired orientation to achieve a desired aeromechanics response of the airfoil.

The turbine engine of the preceding clause, wherein the stiffness of the airfoil is controlled by selecting a percentage of a content of the plurality of reinforcing fibers relative to an amount of a resin.

The turbine engine of any preceding clause, wherein the non-uniform weave structure has a sandwich structure that varies along a thickness direction of the airfoil or varies along a chord direction of the airfoil, or both.

The turbine engine of any preceding clause, wherein the plurality of the reinforcing fibers comprises lighter fibers provided in a center core region of a thickness of the airfoil and denser fibers provided towards a first airfoil surface or a second airfoil surface, or both, of the airfoil.

The turbine engine of any preceding clause, wherein the plurality of reinforcing fibers has a varying modulus or varying sizes, or both, to provide a desired stiffness in desired regions of the airfoil.

The turbine engine of any preceding clause, wherein the airfoil is a stator airfoil of the turbine engine.

The turbine engine of any preceding clause, wherein the airfoil is a rotating airfoil of the turbine engine.

The turbine engine of any preceding clause, wherein the plurality of reinforcing fibers comprises a first plurality of reinforcing fibers, a second plurality of reinforcing fibers, and a third plurality of reinforcing fibers, wherein the second plurality of reinforcing fibers and the third plurality of reinforcing fibers are substantially perpendicular to the first plurality of reinforcing fibers.

The turbine engine of any preceding clause, wherein two or more of the first plurality of reinforcing fibers are provided contiguous to each other near a first airfoil surface of the airfoil or a second airfoil surface of the airfoil, or both, so as to increase a stiffness of the airfoil at the first airfoil surface or at the second airfoil surface, or both.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. An airfoil comprising:
a non-uniform weave structure that is two-dimensional or three-dimensional, the non-uniform weave structure comprising a plurality of reinforcing fibers, the non-uniform weave structure having a first region with a first stiffness and a second region with a second stiffness higher than the first stiffness, the first region corresponding to a center core region of a thickness of the airfoil,
wherein the plurality of reinforcing fibers include higher density fibers in the second region and lower density fibers in the first region so as to increase a stiffness of the airfoil at the second region of the airfoil in a desired orientation to achieve a desired aeromechanics response of the airfoil, and
wherein the plurality of reinforcing fibers comprises a first plurality of reinforcing fibers, a second plurality of reinforcing fibers, and a third plurality of reinforcing fibers, wherein the second plurality of reinforcing fibers and the third plurality of reinforcing fibers are substantially perpendicular to the first plurality of reinforcing fibers.

2. The airfoil of claim 1, wherein the stiffness of the airfoil is controlled by selecting a percentage of a content of the plurality of reinforcing fibers relative to an amount of a matrix.

3. The airfoil of claim 1, wherein the non-uniform weave structure has a sandwich structure that varies along a thickness direction of the airfoil.

4. The airfoil of claim 1, wherein the non-uniform weave structure has a sandwich structure that varies along a chord direction of the airfoil.

5. The airfoil of claim 1, wherein the plurality of the reinforcing fibers comprises lesser dense fibers provided in the center core region of the thickness of the airfoil and denser fibers provided towards a first airfoil surface or a second airfoil surface, or both.

6. The airfoil of claim 1, wherein the plurality of reinforcing fibers has a varying modulus or varying sizes, or both to provide a desired stiffness in desired regions of the airfoil.

7. The airfoil of claim 1, wherein the airfoil is a stator airfoil of a turbine engine.

8. The airfoil of claim 1, wherein the second plurality of reinforcing fibers and the third plurality of reinforcing fibers are substantially parallel to each other and the second plurality of reinforcing fibers have a diameter less than a diameter of the third plurality of reinforcing fibers.

9. The airfoil of claim 1, wherein two of more of the first plurality of reinforcing fibers are provided contiguous to each other near a first airfoil surface of the airfoil or a second airfoil surface of the airfoil, or both, so as to increase a stiffness of the airfoil at the first airfoil surface or at the second airfoil surface, or both.

10. The airfoil of claim 1, wherein the third plurality of reinforcing fibers have a diameter greater than the first plurality of reinforcing fibers and the second plurality of reinforcing fibers, and the third plurality of reinforcing fibers are provided within the center core region of the thickness of the airfoil.

11. The airfoil of claim 1, wherein the plurality of reinforcing fibers further comprises a fourth plurality of reinforcing fibers, the fourth plurality of reinforcing fibers linking the first plurality of reinforcing fibers, the second plurality of reinforcing fibers, and the third plurality of reinforcing fibers.

12. A turbine engine comprising:
an airfoil comprising:
a non-uniform weave structure that is two-dimensional or three-dimensional, the non-uniform weave structure comprising a plurality of reinforcing fibers, the non-uniform weave structure having a first region with a first stiffness and a second region with a second stiffness higher than the first stiffness, the first region corresponding to a center core region of a thickness of the airfoil,
wherein the plurality of reinforcing fibers include higher density fibers in the second region and lower density fibers in the first region so as to increase a stiffness of the airfoil at the second region of the airfoil in a desired orientation to achieve a desired aeromechanics response of the airfoil, and
wherein the plurality of reinforcing fibers comprises a first plurality of reinforcing fibers, a second plurality of reinforcing fibers, and a third plurality of reinforcing fibers, wherein the second plurality of reinforcing fibers and the third plurality of reinforcing fibers are substantially perpendicular to the first plurality of reinforcing fibers.

13. The turbine engine of claim 12, wherein the stiffness of the airfoil is controlled by selecting a percentage of a content of the plurality of reinforcing fibers relative to an amount of a resin.

14. The turbine engine of claim 12, wherein the non-uniform weave structure has a sandwich structure that varies along a thickness direction of the airfoil or varies along a chord direction of the airfoil, or both.

15. The turbine engine of claim 12, wherein the plurality of the reinforcing fibers comprises less denser fibers provided in the center core region of the thickness of the airfoil and denser fibers provided towards a first airfoil surface or a second airfoil surface, or both, of the airfoil.

16. The turbine engine of claim 12, wherein the plurality of reinforcing fibers has a varying modulus or varying sizes, or both to provide a desired stiffness in desired regions of the airfoil.

17. The turbine engine of claim 12, wherein the airfoil is a stator airfoil of the turbine engine.

18. The turbine engine of claim 12, wherein two or more of the first plurality of reinforcing fibers are provided contiguous to each other near a first airfoil surface of the airfoil or a second airfoil surface of the airfoil, or both, so as to increase a stiffness of the airfoil at the first airfoil surface or at the second airfoil surface, or both.

* * * * *